US012429822B2

(12) United States Patent
Calame

(10) Patent No.: US 12,429,822 B2

(45) Date of Patent: Sep. 30, 2025

(54) MECHANICAL MOVEMENT COMPRISING AN INFORMATION DISPLAY DEVICE

(71) Applicant: MANUFACTURE D'HORLOGERIE AUDEMARS PIGUET SA, Le Brassus (CH)

(72) Inventor: Laurent Calame, La Sagne (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 204 days.

(21) Appl. No.: 18/254,765

(22) PCT Filed: Dec. 1, 2021

(86) PCT No.: PCT/EP2021/083680

§ 371 (c)(1),
(2) Date: May 26, 2023

(87) PCT Pub. No.: WO2022/128458

PCT Pub. Date: Jun. 23, 2022

(65) Prior Publication Data

US 2024/0302798 A1 Sep. 12, 2024

(30) Foreign Application Priority Data

Dec. 17, 2020 (CH) ...................................... 1612/20

(51) Int. Cl.
*G04B 19/04* (2006.01)
*G04B 19/02* (2006.01)
*G04B 19/20* (2006.01)

(52) U.S. Cl.
CPC .......... *G04B 19/046* (2013.01); *G04B 19/02* (2013.01); *G04B 19/202* (2013.01)

(58) Field of Classification Search
CPC .... G04B 19/046; G04B 19/02; G04B 19/202; G04B 33/06; G04B 19/04
See application file for complete search history.

(56) References Cited

U.S. PATENT DOCUMENTS 11,500,335 B2 * 11/2022 Maruyama ............... G04C 3/14
11,927,918 B2 * 3/2024 Rey-Mermet ........ G04B 19/048
(Continued)

FOREIGN PATENT DOCUMENTS

CH 691786 A5 10/2001
CH 712411 A2 10/2017
(Continued)

OTHER PUBLICATIONS

International Search Report and Written Opinion of the ISA for PCT/EP2021/083680 mailed Mar. 23, 2022, 11 pages.

*Primary Examiner* — Edwin A. Leon
(74) *Attorney, Agent, or Firm* — NIXON & VANDERHYE

(57) ABSTRACT

Disclosed is a mechanical movement including an information display device including at least one indicator member for the information, mounted pivoting about a pivot axis A. The movement encloses a cavity receiving at least the indicator member, the cavity being arranged so that the indicator member is housed entirely inside the movement. The movement includes at least one mobile arranged pivoting coaxially with the pivot axis A and including an outer peripheral toothing, the mobile being housed in the cavity and arranged to carry the indicator member. The mobile includes a felloe including the outer peripheral toothing and defining an inner opening, the felloe carrying an arm passing radially through the inner opening in order to be mounted pivoting on the pivot axis A, the indicator member being
(Continued)

represented on the arm. Also disclosed is a timepiece including such a mechanical movement.

20 Claims, 4 Drawing Sheets

(56) References Cited

U.S. PATENT DOCUMENTS

| | | | | |
|---|---|---|---|---|
| 12,025,957 | B2 * | 7/2024 | Yamaguchi | G04B 19/048 |
| 12,117,774 | B2 * | 10/2024 | Wharton | G04B 19/241 |
| 12,164,268 | B2 * | 12/2024 | Guillaume | G04B 17/063 |
| 12,174,586 | B2 * | 12/2024 | Martel | G04B 19/202 |
| 12,197,172 | B2 * | 1/2025 | Nakazawa | G04B 9/005 |
| 12,259,688 | B2 * | 3/2025 | Graemiger | G04B 19/06 |

FOREIGN PATENT DOCUMENTS

| | | | |
|---|---|---|---|
| EP | 2791738 | A1 | 10/2014 |
| EP | 3136187 | A1 | 3/2017 |
| EP | 3698218 | A1 | 8/2020 |
| FR | 2461292 | A1 | 1/1981 |
| FR | 3040799 | A1 | 3/2017 |
| WO | 2013087941 | A1 | 6/2013 |
| WO | 2019076924 | A1 | 4/2019 |

* cited by examiner

MECHANICAL MOVEMENT COMPRISING AN INFORMATION DISPLAY DEVICE

CROSS-REFERENCE TO RELATED APPLICATIONS

This application is the U.S. national phase of International Application No. PCT/EP2021/083680 filed Dec. 1, 2021 which designated the U.S. and claims priority to CH Patent Application No. 01612/20 filed Dec. 17, 2020, the entire contents of each of which are hereby incorporated by reference.

TECHNICAL FIELD

The present invention relates to a mechanical movement comprising an information display device, such as information linked to the time, for example the hour, comprising at least one indicator member for said information, mounted pivoting about a pivot axis A.

The present invention also relates to a timepiece comprising such a mechanical movement.

PRIOR ART

Devices for displaying information such as information linked to the time, for example the hour and, more particularly, the current hour, can be conventionally of the analog display type. These display devices having a traditional hand-fitting use a hand to display the hours and a hand to display the minutes, these two hands moving, by pivoting about the same axis, with respect to a dial bearing graduations for the hours and the minutes with which they cooperate in order to display the time. A second hand can complete the display. Substantially at one of their ends, the hour hand and the minute hand are pierced by a hole, which makes it possible to fix the hour hand and the minute hand on the pipe of the hour wheel and the cannon-pinion respectively, positioned under the dial. The hour and minute hands are therefore driven in rotation by the hour wheel and by the cannon-pinion respectively via a hand portion which passes through the axis of rotation common to both hands. The distal end of each hand constitutes the indicator part intended to cooperate with the graduations of the dial.

However, the disadvantage of this well-known display device is that it occupies a significant volume, in particular in the direction of the thickness of the movement, due to the stacking of the various components and the necessary number of stages. For this reason, the volume available inside the case in which the movement is positioned must be large enough to accommodate, in addition to the movement, a dial placed above the movement and the hands positioned above the dial. This display device having a traditional hand-fitting cannot therefore be used in an ultra-thin mechanical timepiece.

Ultra-thin display solutions have been proposed, for example, in patent CH 691786, using a display device comprising a central disk for displaying the hours and an outer ring for displaying the minutes, concentric with the hour disk. The disk and the ring carry indexes which move in rotation with respect to a dial carrying graduations, at appropriate speeds, in order to display the time. However, in this device, the minute index necessarily appears as though it is cut in the center, seeming to be hidden by the central disk. It is therefore not possible to use a traditional hand-fitting type display, with the two hour and minute hands appearing pivoted on the same axis in the center of the display.

Another solution involving an ultra-thin device for displaying the current time has been described in patent CH 712411. In this device, it is provided that the hour wheel carries an indication intended to cooperate with a first fixed indication in order to indicate the hours, and that the minute wheel, having an axis of rotation different to that of the hour wheel, carries an indication intended to cooperate with a second fixed indication in order to indicate the minutes, the first and second fixed indications being carried by the frame of the watch-movement. Thanks to these characteristics, the minute and hour wheels directly play the role of display members for the minutes, respectively, for the hours, while the corresponding graduations are carried directly by the frame of the watch-movement, for example by the plate. Thus, this display device makes it possible to reduce both the number of components required and the bulk of the display device with reference to known display devices. However, here again, it does not allow a display of the traditional hand-fitting type, with the two hour and minute hands pivoted on the same axis in the center of the display.

A solution described in patent FR 2 461 292 has been proposed to produce an extra-thin electronic watch. It is proposed that an hour disk and a minute disk be positioned in the bottom of the watch, which is used as a plate, these disks being solid transparent disks on which are provided guide-marks which act as an hour hand and a minute hand. The thick elements of the watch, such as the motor, the quartz and the battery, are located outside the field of the display disks, in housings made between the bottom and the watch case middle-bezel so as to obtain an extra-thin watch. However, the arrangement of the various members of a mechanical watch is more complex than that of an electronic watch. In addition, the use of solid disks has certain drawbacks, in particular a certain inertia. Since the mass of the solid disks is significant, a large amount of energy is necessary to set them in motion. This can cause difficulties in guaranteeing that the very small gap between the solid disks is maintained when the watch experiences, for example, unexpected shocks. Furthermore, there is another disadvantage to using solid disks made of transparent material, namely of creating a parallax problem which occurs when viewed obliquely with respect to the display device. Indeed, the stacking of one or more transparent disks with the glass accentuates the parallax effect, which can thus distort the accuracy of the reading.

The present invention aims to remedy at least some of these drawbacks by proposing a device for displaying information which makes it possible to produce an ultra-thin mechanical watch-movement.

In particular, the invention proposes a device for displaying several pieces of information arranged to indicate the time in the manner of a traditional hand-fitting while being able to be used in an ultra-thin mechanical watch-movement.

DISCLOSURE OF THE INVENTION

To this end, the invention relates to a mechanical movement comprising an indication display device comprising at least one indicator member for said information, mounted pivoting about a pivot axis A, said movement enclosing a cavity receiving at least said first indicator member, said cavity being arranged so that said indicator member is housed entirely inside the movement, said movement comprising at least one mobile arranged pivoting coaxially with the pivot axis A and comprising an outer peripheral toothing, said mobile being housed in the cavity and arranged to carry said indicator member.

According to the invention, said mobile comprises a felloe including said outer peripheral toothing and defining an inner opening, said felloe carrying an arm passing radially through said inner opening in order to be mounted pivoting on said pivot axis A, the indicator member being represented on said arm.

Such a construction makes it possible to advantageously eliminate the conventional drive via the pipe of an associated drive wheel which passes through the pivot axis, and which represents a significant bulk. It advantageously makes possible a gain in height, making it possible to reduce the bulk of the display device.

Thus, the indicator member is entirely integrated inside the mechanical movement, and does not exit the volume occupied by said movement as such and, more particularly, in the direction of the thickness of the movement. With such a movement, it is therefore possible to produce an ultra-thin mechanical timepiece, the available interior volume of the case being barely larger than the volume occupied by the movement integrating the display device.

Moreover, the mobile carrying the indicator member used in the present invention makes it possible to have a perforated mobile which does not require significant energy to be set in motion. It does not cause parallax problems either, even when several mobiles of the same type are superimposed.

Advantageously, the display device can comprise at least one first indicator member for a first piece of information and a second indicator member for a second piece of information mounted pivoting about the pivot axis A and disposed in said cavity, said second indicator member being superimposed on said first indicator member, said cavity being arranged so that said first indicator member and said second indicator member are housed entirely inside the movement, and the movement comprises a first mobile arranged pivoting coaxially with the pivot axis A and comprising a first outer peripheral toothing, said first mobile being housed in the cavity and arranged to carry said first indicator member and a second mobile housed in the cavity, arranged pivoting coaxially with the pivot axis A, and comprising a second felloe including a second outer peripheral toothing and defining a second inner opening, through which the first indicator member can appear, said second felloe carrying a second arm passing radially through said second opening in order to be mounted pivoting on said pivot axis A, the second indicator member being represented on said second arm.

According to a first embodiment, said first mobile is a solid wheel comprising said first outer peripheral toothing, and on which the first indicator member is represented.

According to another embodiment, said first mobile comprises a first felloe including said first outer peripheral toothing and defining a first inner opening, said first felloe carrying a first arm passing radially through said first opening in order to be mounted pivoting on said pivot axis A, the first indicator member being represented on said first arm.

Advantageously, the display device can comprise at least one third indicator member for a third piece of information disposed in the cavity, superimposed on said second indicator member, said third indicator member being mounted pivoting about the pivot axis A, said cavity being arranged so that said third indicator member is housed entirely inside the movement with the first and second indicator members, and the movement comprises a third mobile housed in the cavity, arranged pivoting coaxially with the pivot axis A and comprising a third felloe including a third outer peripheral toothing and defining a third inner opening, through which the first and second indicator members can appear, said third felloe carrying a third arm passing radially through said third opening in order to be mounted pivoting on said pivot axis A, the third indicator member being represented on said third arm.

These embodiments are particularly suitable for displaying the time for example, the first indicator member displaying the hours, the second indicator member, superimposed on said first indicator member, displaying the minutes, any third indicator member, superimposed on said first and second indicator members, displaying the seconds, being mounted pivoting about said pivot axis A, and the cavity is arranged so that said second indicator member and any third indicator member are housed entirely inside the movement, with the first indicator member.

Thus, a device is obtained for displaying the current time of the traditional hand-fitting type, entirely integrated into the movement, which makes it possible to produce an ultra-thin timepiece.

The present invention also relates to a timepiece comprising a mechanical movement as defined below.

BRIEF DESCRIPTION OF THE DRAWINGS

Other characteristics and advantages of the present invention will appear on reading the following detailed description of various embodiments of the invention, which are provided by way of non-limiting examples, with reference to the appended drawings in which.

EMBODIMENTS OF THE INVENTION

The present invention relates to a mechanical watch-movement comprising a device for displaying information, in particular information linked to the time, such as the seconds, the minutes or the hours, these different pieces of information being able to be used individually or by combining at least the hours and the minutes in order to indicate the current time. According to the definition provided by the Professional Illustrated Dictionary of Watchmaking by G.-A. Berner, a watch-movement is the mechanical part of a timepiece comprising all of the members and the mechanisms which serve to determine the time (the main ones being the motor, the finishing geartrain, the escapement and the regulating organ), carried by a frame. The movement is intended to be disposed in a case, called a watch case, with the display device, to constitute the timepiece. In the present description, it is considered that the movement 1 occupies a volume which is represented symbolically in FIGS. 1 to 6 by an ultra-thin, closed cylinder, so as to represent an ultra-thin movement. The various members and mechanisms making up the mechanical watch-movement are known to the person skilled in the art, and are not represented.

Figure 1:
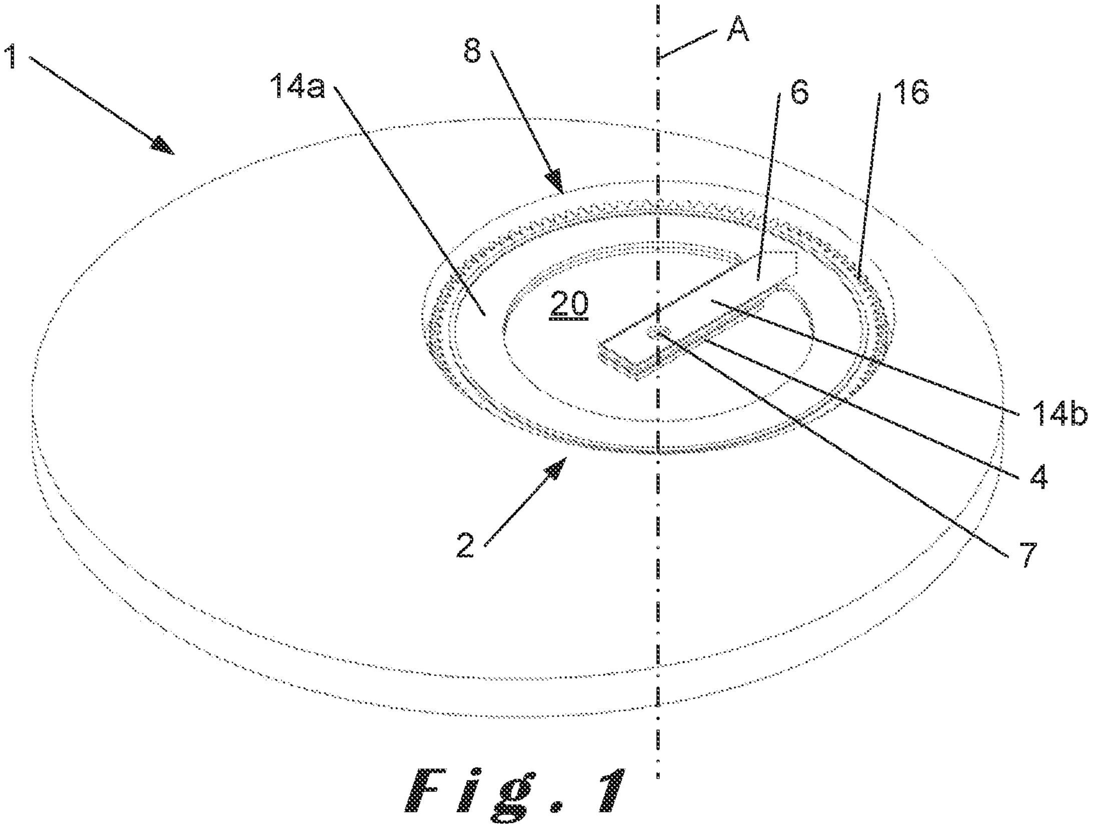
FIG. 1 is an isometric view of a first embodiment of a movement according to the invention.
Figure 2:
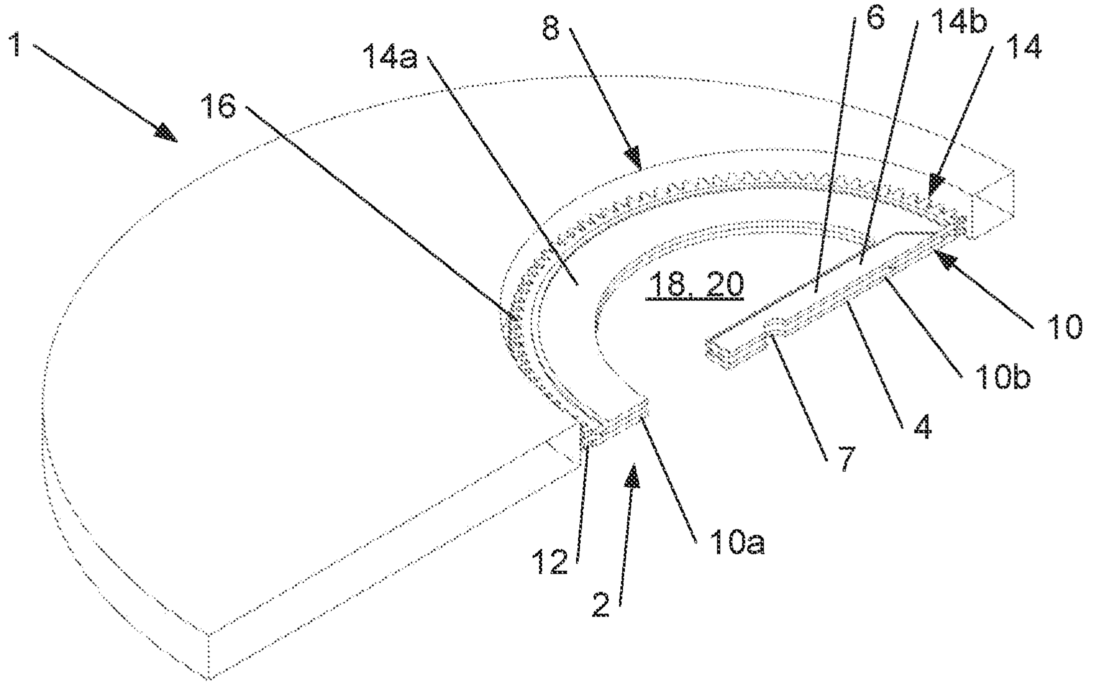
FIG. 2 represents the movement from FIG. 1 with a section.

Traditionally, and with reference to FIGS. 1 and 2 representing a first embodiment of the invention, the display device 2 comprises at least one first indicator member 4 for a first piece of information, such as the hour in order to display the hour, and a second indicator member 6 for a second piece of information, such as the minute in order to display the minutes, superimposed on the first indicator member 4, that is to say placed in front of the first indicator member 4 for a user who is looking at the movement 1. Thus, the display device 2 is advantageously a device for displaying the current time HH.MM.

Each indicator member 4, 6 is mounted pivoting about the same pivot axis A passing through the center of the display device 2. Each indicator member 4, 6 is represented by a hand having, at one end, a hole 7, through which the pivot axis A passes and, at the other end, a tip directed towards the outside of the movement 1. Thus, the indicator members 4, 6 appear as a set of hands disposed in the center of the display device 2 in order to indicate the current time, in the traditional way.

The movement 1 encloses a cavity 8 which, here, receives the first and second indicator members 4, 6, said cavity being arranged so that said first and second indicator members 4, 6 are housed entirely inside the movement 1. More particularly, the cavity 8 has in particular a depth, that is to say in the direction of the thickness of the movement 1, which is selected so that the first and second indicator members 4, 6 remain inside the volume occupied by the movement 1, whatever their display position.

Said cavity 8 is at least open on the side of the movement on which the display device 2 must be visible to the user. The bottom of the cavity 8 can be closed. In this case, the cavity 8 can be constituted by a recess provided in the plate of the movement, for example. In another variant, the cavity 8 can be passed through, which can allow the movement to appear under the display device, as in the embodiment represented in FIGS. 1 and 2. This can be particularly useful for producing a skeleton watch. The passed-through cavity 8 can be formed, for example, by arranging the various members and mechanisms of the movement disposed with respect to one another, so as to constitute said cavity inside the movement.

The movement 1 can be closed by an open plate at the level of the cavity 8, so as to only leave the indicator members 4, 6 of the display device 2 visible. Fixed time indications can be provided on this plate, in order to cooperate with the indicator members 4, 6, in order to display the hours and the minutes like a dial. In the case of a skeleton watch, the movement is left open.

In order to be able to housed fully inside the movement 1, the display device 2 must have a reduced thickness.

To this end, at least one of the first and second indicator members, and preferably the first and second indicator members 4 and 6, are advantageously arranged to be driven in rotation about the pivot axis A through an outer peripheral zone which does not pass through said pivot axis A. The fact that the indicator members 4, 6 are driven from the outside advantageously makes it possible to eliminate the different stages imposed by the traditional construction of the pipes of the hour wheel and of the cannon-pinion, and to thus reduce the overall thickness.

The movement 1 preferably comprises at least one first lower mobile 10 arranged pivoting coaxially with the pivot axis A and comprising a first outer peripheral toothing 12, said first mobile 10 being housed in the cavity 8 and arranged to carry the first indicator member 4. The movement 1 also comprises a second upper mobile 14 arranged pivoting coaxially with the pivot axis A and comprising a second outer peripheral toothing 16, said second mobile 14 being housed in the cavity 8 and arranged to carry the second indicator member 6.

In the embodiment represented in FIGS. 1 and 2, and in accordance with the invention, the first mobile 10 comprises a first felloe 10*a* including said first outer peripheral toothing 12 and defining a first circular inner opening 18 centered about the pivot axis A, and through which the movement appears, the cavity 8 being passed through (or the bottom of the cavity when the latter is closed by the bottom).

The first felloe 10*a* carries a first arm 10*b* passing radially through the first opening 18 in the direction of the pivot axis A, and having at its end the hole 7 which makes it possible for said arm 10*b* to be mounted pivoting on the pivot axis A.

The arm 10*b* is preferably in one piece with the felloe 10*a* and in the same plane as said felloe 10*a* so as to limit the thickness of the first mobile 10.

The first indicator member 4 is represented on the first arm 10*b*, for example by representing on the arm 10*b*, at the distal end of the arm 10*b*, opposite the hole 7, a tip directed towards the outside of the movement 1 to constitute the tip of a hand, the proximal part of the arm 10*b* constituting the body of the hand, so as to symbolize the hour hand. Advantageously, the first indicator member 4 represented on the first mobile 10 has been obtained by engraving or by transfer on the arm 10*b* such that the first indicator member 4 is coincident with said arm 10*b*, so as to have a reduced thickness.

Similarly, the second mobile 14 comprises a second felloe 14*a* including the second outer peripheral toothing 16 and defining a second inner opening 20 centered about the pivot axis A, through which the first indicator member 4 can appear when it is staggered with respect to the second indicator member 6, as well as the movement, the cavity 8 being passed through. The first and second openings 18, 20 are substantially of the same dimensions.

The second felloe 14*a* carries a second arm 14*b* passing radially through said second opening 20 in the direction of the pivot axis A, and having at its end the hole 7, which makes it possible for said arm 14*b* to be mounted pivoting on said pivot axis A.

The arm 14*b* is preferably in one piece with the felloe 14*a* and in the same plane as said felloe 14*a* so as to limit the thickness of the second mobile 14.

The fact that the mobiles 10 and 14 are perforated means that they are light and do not require a significant amount of energy to be set in motion. Nor do they lead to parallax problems linked to the use of a transparent material, even when several mobiles of the same type are superimposed.

The second indicator member 6 is represented on the second arm 14*b*, for example by representing on said arm 14*b*, at the distal end of the arm 14*b*, opposite the hole 7, a tip directed towards the outside of the movement 1 to constitute the tip of a hand, the proximal part of the arm 14*b* constituting the body of the hand, so as to symbolize the minute hand. Advantageously, the second indicator member

6 represented on the second mobile 14 has been obtained by engraving or by transfer on the arm 14*b*, such that the second indicator member 6 coincides with said arm 14*b* so as to have a reduced thickness.

The second mobile 14 is superimposed on the first mobile 10 so as to leave between them, and more particularly between the felloes 10*a*, 14*a*, on the one hand, and between the arms 10*b*, 14*b*, on the other hand, the required adequate play to allow them to rotate freely.

Furthermore, the movement 1 comprises a drive mechanism for the first and second mobiles 10, 14 arranged to cooperate with the first and second outer peripheral toothing 12, 16 of said first and second mobiles 10, 14 respectively.

Such a drive mechanism comprises, in particular, geartrains arranged to kinematically connect the outer peripheral toothing 12, 16 to the finishing geartrain in order to drive the first and second mobiles 10, 14 at the appropriate angular speeds for the corresponding indicator member 4, 6 from the outside, the first and second mobiles 10, 14 being moreover guided in the center.

The cavity 8 has a determined depth so that the first and second superimposed indicator members 4, 6 and their respective superimposed mobiles 10, 14 are housed entirely inside the movement 1, whatever their display position.

Figure 3:
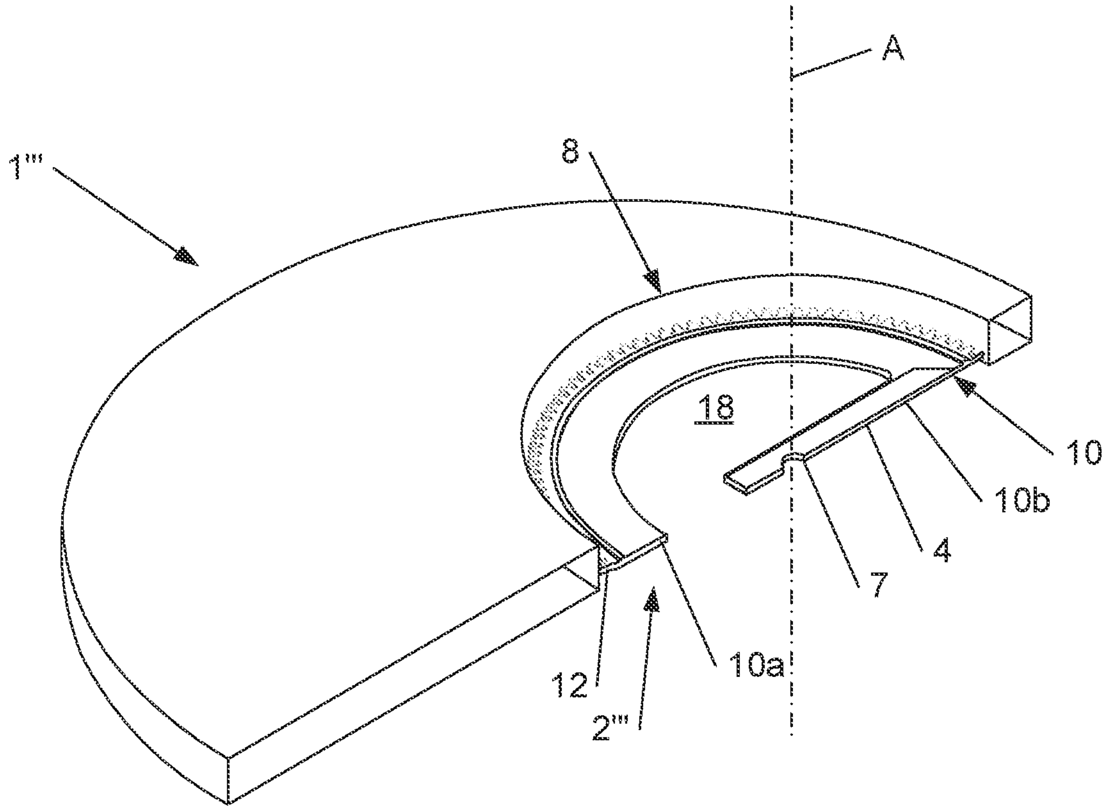
FIG. 3 is an isometric cutaway view of a second embodiment of a movement according to the invention.
Figure 4:
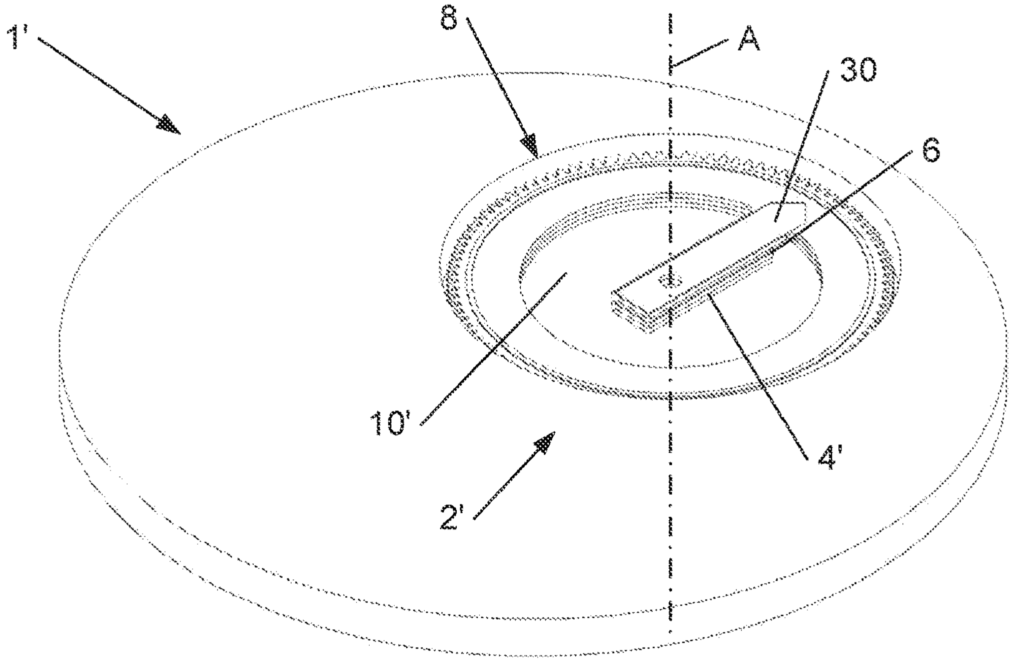
FIG. 4 is an isometric view of a third embodiment of a movement according to the invention.
Figure 5:
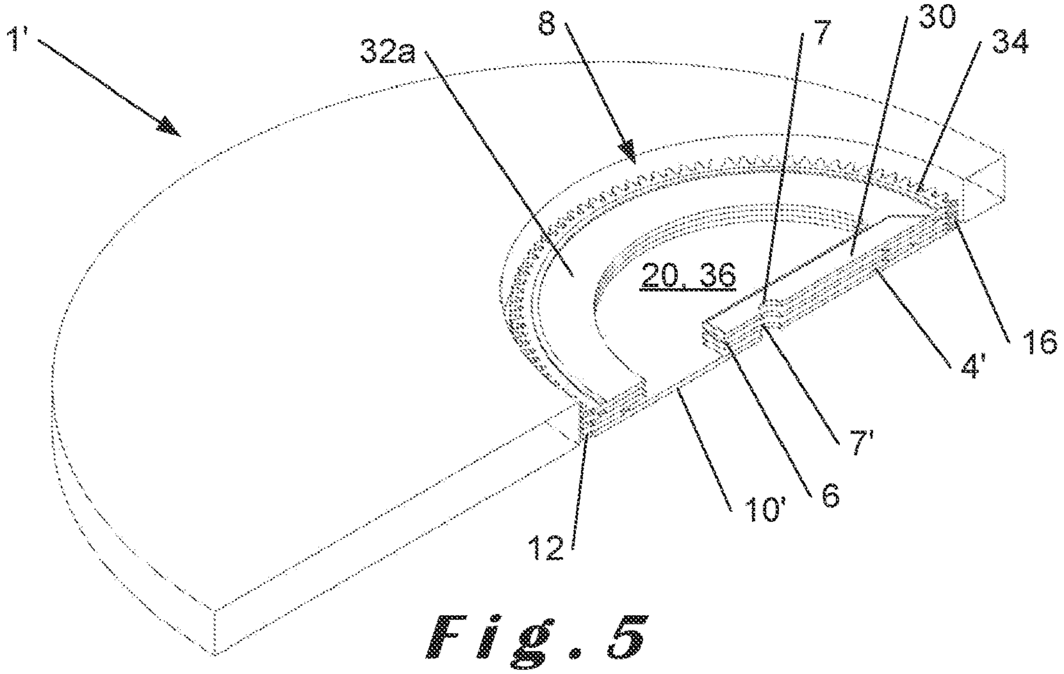
FIG. 5 represents the movement from FIG. 4 with a section.

Another embodiment is represented in FIG. 3, in which the display device 2''' comprises a single indicator member 4. The elements identical to the first embodiment of FIGS. 1 and 2 are referred to again with the same reference numerals. Such an indicator member 4 is, for example, a chronograph hand.

The indicator member 4 is mounted pivoting about the pivot axis A, passing through the center of the display device 2'''. As described above, the indicator member 4 is represented by a hand having, at one end, a hole 7 through which the pivot axis A passes and, at the other end, a tip directed towards the outside of the movement 1'''. Said movement 1''' encloses the cavity 8 receiving said indicator member 4, said cavity 8 being arranged so that said indicator member 4 is housed entirely inside the movement 1'''.

The movement 1''' comprises a mobile 10 arranged pivoting coaxially with the pivot axis A and comprising an outer peripheral toothing 12, said mobile 10 being housed in the cavity 8 and arranged to carry said indicator member 4.

In accordance with the invention, the mobile 10 comprises a felloe 10*a* including said outer peripheral toothing 12 and defining an inner opening 18, said felloe 10*a* carrying an arm 10*b* passing radially through said inner opening 18 in order to be mounted pivoting on said pivot axis A, the indicator member 4 being represented on said arm 10*b*. Advantageously, the indicator member 4 represented on the mobile 10 has been obtained by engraving or by transfer on the arm 10*b*, such that the indicator member 4 coincides with said arm 10*b*, so as to have a reduced thickness.

Such a perforated mobile 10 is light and does not require a significant amount of energy to be set in motion. It does not cause parallax problems linked to the use of a transparent material either.

As described above, a drive mechanism is provided for the mobile 10 arranged to cooperate with the outer peripheral toothing 12 of said mobile 10 in order to drive the mobile 10 at an appropriate angular speed for the indicator member 4 from the outside, the mobile 10 being moreover guided in the center.

Another embodiment is represented in FIGS. 4 to 8, in which the display device 2' comprises a first indicator member 4' for a first piece of information, such as the hour, a second indicator member 6 for a second piece of information, such as the minutes, and a third indicator member 30 for a third piece of information, such as the seconds. The elements identical to the embodiments of FIGS. 1 to 3 are referred to again with the same reference numerals. Thus, the display device 2' is also advantageously a device for displaying the time HH.MM.SS.

The third indicator member 30 for displaying the seconds, here, is superimposed on the second indicator member for the minutes 6, here, that is to say placed in front of the second indicator member 6 for a user who is looking at the movement 1'. All the indicator members 4', 6 and 30 are mounted pivoting about the same pivot axis A passing through the center of the display device 2'. Each indicator member 4', 6 and 30 is represented by a hand having, at one end, a hole 7', 7 through which the pivot axis A passes and, at the other end, a tip directed towards the outside of the movement 1'. Thus, the indicator members 4', 6 and 30 appear as a set of hands disposed in the center of the display device 2' in order to indicate the current time and the second, in the traditional way.

In this embodiment, the first lower mobile 10' is a solid wheel comprising the first outer peripheral toothing 12 and pierced in its center by the hole 7' through which the pivot axis A passes. Thus, the solid wheel of the first mobile 10' constitutes a dial bottom for the display device 2'. The cavity 8 can be closed by the bottom or open out, the bottom of the display device 2' being constituted by the solid wheel of the first mobile 10'.

Figure 7:
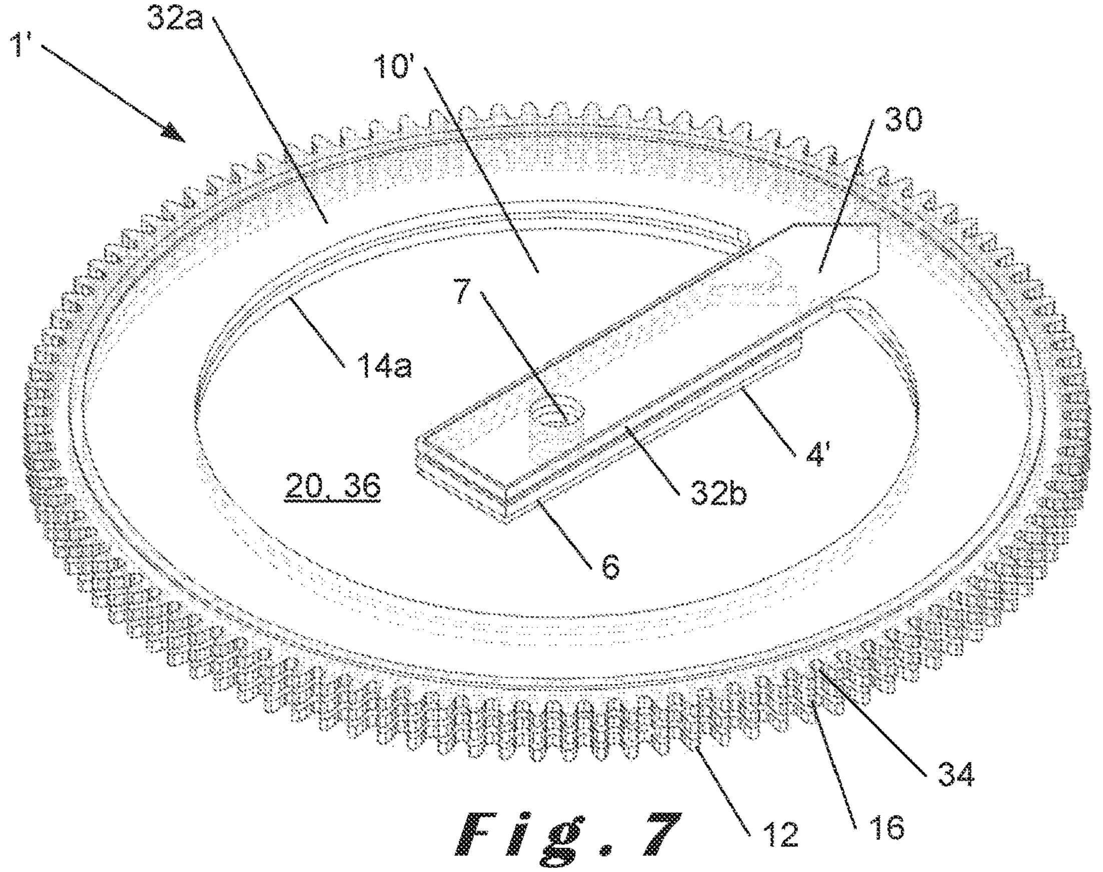
FIG. 7 is an isometric view of the mobiles and their superimposed indicator members which are aligned in the direction of the thickness of the movement in order to display 00h00min00sec.
Figure 8:
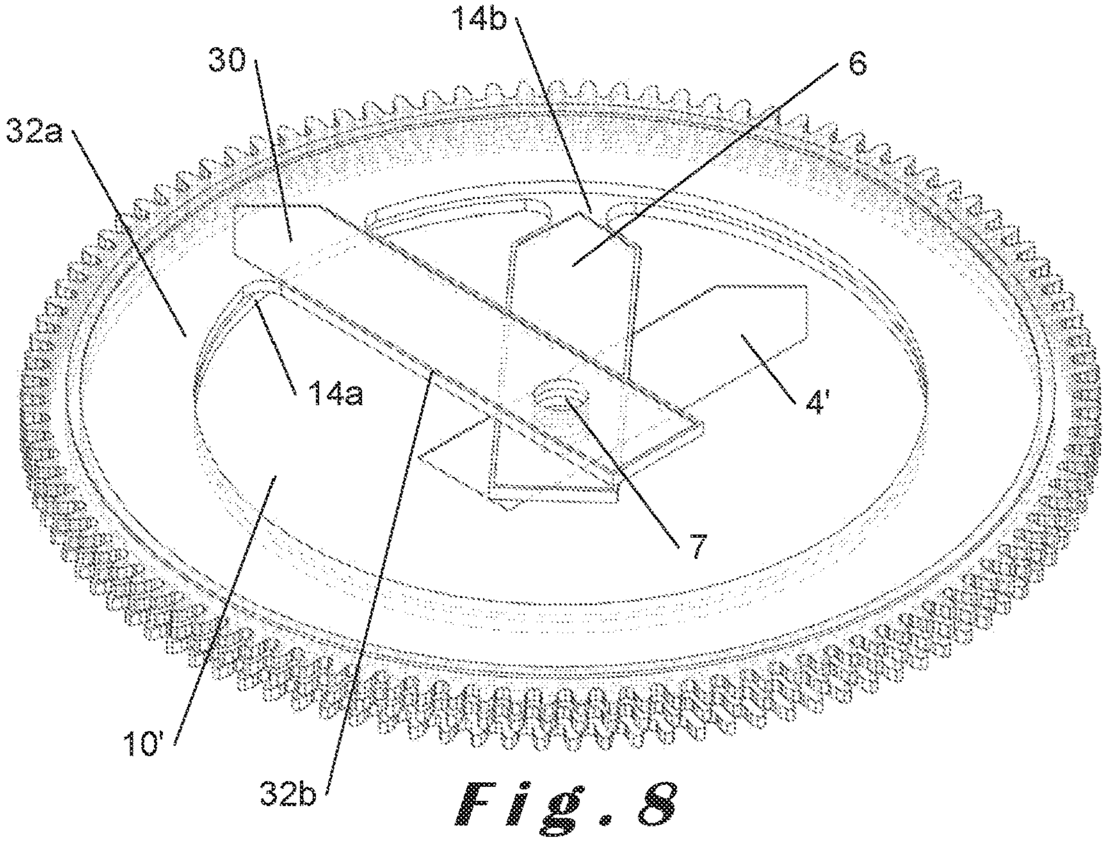
FIG. 8 is an isometric view of the mobiles and their superimposed indicator members which are staggered with respect to each other in order to display a different current time from 00hr00min00sec.

As shown more specifically in FIGS. 7 and 8, the first hour indicator member 4' is represented directly on the solid wheel of the first mobile 10' so that the first indicator member 4' and the bottom of the display device 2' are coincident, so as to have a reduced thickness. The first indicator member 4' is represented in the form of an hour hand, the tip of which is directed towards the outside of the movement and the body of which is disposed radially in the direction of the pivot axis A, extending about the hole 7'. Advantageously, the first indicator member 4' represented on the first mobile 10' has been obtained by engraving or transfer directly on the solid wheel of the first mobile 10'.

The second indicator member 6 for minutes is identical to that of the first embodiment, with its mobile 14, here in the intermediate position, comprising the felloe 14*a* and the arm 14*b*, and the outer peripherical toothing 16. The solid wheel of the first mobile 10' with the first indicator member 4' appears through the inner opening 20.

The part of the arm 14*b*, between its junction with the felloe 14*a* and the tip of the second indicator member 6, can be thinned in order to better highlight said indicator member 6, as shown in FIG. 8.

Figure 6:
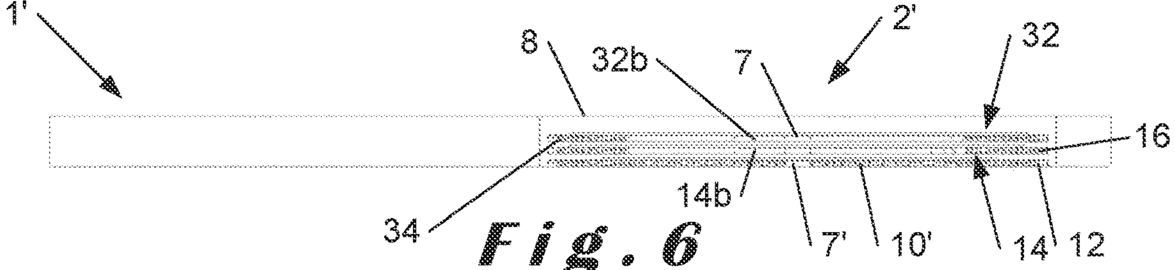
FIG. 6 is a sectional view of the movement from FIG. 4.

The third indicator member 30 is disposed in the cavity 8, superimposed on the second indicator member 6, mounted pivoting about the pivot axis A. The cavity 8 is arranged so that said third indicator member 30 is housed entirely inside the movement 1' with the first and second indicator members 4', 6, as shown in FIG. 6.

The third indicator member 30 is arranged to be driven in rotation about the pivot axis A through a peripheral zone which does not pass through said pivot axis A.

To this end, the movement 1' comprises a third upper mobile 32 arranged to pivot coaxially with the pivot axis A and comprising a third outer peripheral toothing 34, said third mobile 32 being housed in the cavity 8 and arranged to carry the third indicator member 30.

The third mobile 32 comprises a third felloe 32*a* comprising the third outer peripheral toothing 34 and defining a third inner opening 36 centered about the pivot axis A, and through which the first and second indicator members 4', 6 can appear when they are staggered with respect to the third indicator member 30, as well as the solid wheel of the first mobile 10'. The second and third openings 20, 36 are substantially of the same dimensions.

The third felloe 32*a* carries a third arm 32*b* passing radially through the third opening 36 in the direction of the pivot axis A, and having at its end the hole 7 which makes it possible for said arm 32*b* to be mounted pivoting on said pivot axis A.

The arm 32*b* is preferably in one piece with the felloe 32*a* and in the same plane as said felloe 32*a* so as to limit the thickness of third mobile 32.

The third indicator member 30 is represented on the third arm 32*b*, for example by representing on said arm 32*b*, at the distal end of the arm 32*b*, opposite the hole 7, a tip directed towards the outside of the movement 1' to constitute the tip of a hand, the proximal part of the arm 32*b* constituting the body of the hand, so as to symbolize the second hand. Advantageously, the third indicator member 30 represented on the third mobile 32 has been obtained by engraving or by transfer on the arm 32*b*, such that the third indicator member 30 is coincident with said arm 32*b*, so as to have a reduced thickness.

The third mobile 32 is superimposed on the second mobile 14 so as to leave between them, and more particularly between the felloes 14*a*, 32*a*, on the one hand, and between the arms 14*b*, 32*b*, on the other hand, the required adequate play to allow them to rotate freely. Similarly, the second mobile 14 is superimposed on the first mobile 10' so as to leave between them, and more particularly between the felloe 14*a* with the arm 14*b* and the solid wheel, the required adequate play to allow them to rotate freely.

Furthermore, the movement 1' comprises a drive mechanism for the third mobile 32 arranged to cooperate with the third outer peripheral toothing 34 of the third mobile 32.

Such a drive mechanism comprises in particular a geartrain arranged to kinematically connect the outer peripheral toothing 34 to the finishing geartrain in order to drive the third mobile 32 at the appropriate angular speed for the indicator member 30 from the outside, the third mobile 32 being moreover guided in the center.

The cavity 8 has a determined depth so that the first, second and third superimposed indicator members 4', 6 and 30 and their superimposed respective mobiles 10', 14, 32 are housed entirely inside the movement 1', whatever their display position.

It is obvious that according to a variant which is not represented of the second embodiment, the first hour indicator member can be carried by the same first mobile as that of the first embodiment, having a felloe, an arm on which said first hour indicator member is represented, and an inner opening through which the movement appears.

The movement of the invention makes it possible, for example, to produce a device for displaying the current time of the ultra-thin traditional hand-fitting type, thanks to the elimination of the different stages imposed by the traditional construction of the pipes of the hour wheel and of the cannon-pinion, the various mobiles carrying the indicator members being driven from the outside while being guided in the center, and the use of at least one or two upper mobiles constituted by open ultra-thin discs in hand form, revealing the lower mobile carrying the first hour indicator member. The use of these two or three ultra-thin mobiles makes it possible to further reduce the thickness of the display device, in order to be able to integrate it entirely into a movement to form an ultra-thin timepiece with a traditional hand-fitting. In addition, the fact that the mobiles used are advantageously perforated means they are light and do not require a significant amount of energy to be set in motion. They do not cause parallax problems linked to the use of a transparent material either, even when several mobiles of the same type are superimposed.

It is obvious that the movement of the invention can comprise other indicator members which are not housed entirely inside said movement.

The invention claimed is:

1. A mechanical movement comprising an information display device comprising at least one indicator member for said information, mounted pivoting about a pivot axis A, said movement enclosing a cavity receiving at least said indicator member, said cavity being arranged so that said indicator member is housed entirely inside the movement, said movement comprising at least one mobile arranged pivoting coaxially with the pivot axis A and comprising an outer peripheral toothing, said mobile being housed in the cavity and arranged to carry said indicator member, wherein said mobile comprises a felloe including said outer peripheral toothing and defining an inner opening, said felloe carrying an arm passing radially through said inner opening in order to be mounted pivoting on said pivot axis A, the indicator member being represented on said arm.

2. The movement according to claim 1, wherein the movement is closed by an open plate at the level of said cavity.

3. The movement according to claim 1, wherein said cavity is passed through.

4. The movement according to claim 1, further comprising a drive mechanism of the mobile arranged to cooperate with the outer peripheral toothing of said mobile.

5. The movement according to claim 1, wherein the display device comprises at least one first indicator member for a first piece of information and a second indicator member for a second piece of information mounted pivoting about the pivot axis A and disposed in said cavity, said second indicator member being superimposed on said first indicator member, said cavity being arranged so that said first indicator member and said second indicator member are housed entirely inside the movement, and wherein the movement comprises a first mobile arranged pivoting coaxially with the pivot axis A and comprising a first outer peripheral toothing, said first mobile being housed in the cavity and arranged to carry said first indicator member and a second mobile housed in the cavity, arranged pivoting coaxially with the pivot axis A, and comprising a second felloe including a second outer peripheral toothing and defining a second inner opening, through which the first indicator member can appear, said second felloe carrying a second arm passing radially through said second opening in order to be mounted pivoting on said pivot axis A, the second indicator member being represented on said second arm.

6. The movement according to claim 5, wherein said first mobile is a solid wheel comprising said first outer peripheral toothing, and on which the first indicator member is represented.

7. The movement according to claim 5, wherein said first mobile comprises a first felloe including said first outer peripheral toothing and defining a first inner opening, said first felloe carrying a first arm passing radially through said first opening in order to be mounted pivoting on said pivot axis A, the first indicator member being represented on said first arm.

8. The movement according to claim 5, wherein the second mobile is superimposed on the first mobile so as to leave between the second and first mobiles the required adequate play to allow the second and first mobiles to rotate freely.

9. The movement according to claim 5, further comprising a drive mechanism for the first and second mobiles arranged to cooperate with the first and second outer peripheral toothing of said first and second mobiles respectively.

10. The movement according to claim 5, wherein the display device comprises at least one third indicator member for a third piece of information disposed in said cavity, superimposed on said second indicator member, said third indicator member being mounted pivoting about the pivot axis A, said cavity being arranged so that said third indicator member is housed entirely inside the movement with the first and second indicator members, and wherein the movement comprises a third mobile housed in the cavity, arranged pivoting coaxially with the pivot axis A and comprising a third felloe including a third outer peripheral toothing and defining a third inner opening, through which the first and second indicator members can appear, said third felloe carrying a third arm passing radially through said third opening in order to be mounted pivoting on said pivot axis A, the third indicator member being represented on said third arm.

11. The movement according to claim 10, wherein the third mobile is superimposed on the second mobile so as to leave between the third and second mobiles the required adequate play to allow the third and second mobiles to rotate freely.

12. The movement according to claim 10, further comprising a drive mechanism of the third mobile arranged to cooperate with the third outer peripheral toothing of said third mobile.

13. The movement according to claim 5, wherein at least two of said first, second and third openings of the first, second and third felloes respectively are substantially of the same dimensions.

14. The movement according to claim 5, wherein the first arm, respectively the second arm, respectively the third arm, is in one piece and in the same plane as the first felloe, respectively the second felloe, respectively the third felloe.

15. The movement according to claim 10, wherein the cavity has a determined depth so that the first, second and third superimposed indicator members and the first, second and third superimposed indicator members' superimposed respective mobiles are housed entirely inside the movement.

16. The movement according to claim 10, wherein the display device displays the time, the first piece of information indicated by the first indicator member being the hour, the second piece of information indicated by the second indicator member being the minute, and the third piece of information indicated by the third indicator member being the second.

17. The movement according to claim 1, wherein the indicator members are represented by hands, the tip of which is directed towards the outside of the movement.

18. The movement according to claim 1, wherein the indicator member represented on the indicator member's respective mobile has been obtained by engraving or transfer.

19. A timepiece comprising a mechanical movement according to claim 1.

20. The movement according to claim 2, wherein said cavity is passed through.

* * * * *